United States Patent [19]

DePue et al.

[11] Patent Number: 5,610,224
[45] Date of Patent: Mar. 11, 1997

[54] WATER DISPERSIBLE IONIC AND NONIONIC POLYAMIDE MODIFIED POLYURETHANE RESINS FOR USE IN COATING COMPOSITION

[75] Inventors: Jeffrey S. DePue, Urbana, Ill.; Gregory G. Menovcik, Farmington Hills, Mich.

[73] Assignee: BASF Corporation, Southfield, Mich.

[21] Appl. No.: 695,324

[22] Filed: Jul. 29, 1996

Related U.S. Application Data

[63] Continuation of Ser. No. 328,623, Oct. 25, 1994, abandoned, which is a continuation-in-part of Ser. No. 969,662, Oct. 30, 1992, abandoned.

[51] Int. Cl.$^6$ ............................. C08L 75/12; C08L 77/00
[52] U.S. Cl. ..................... 524/538; 524/507; 524/517; 525/131; 525/417; 525/424
[58] Field of Search ........................... 525/424, 417, 525/131; 524/538, 507, 514

[56] References Cited

U.S. PATENT DOCUMENTS

| 3,892,820 | 7/1975 | Goto et al. .................... 525/424 |
| 4,092,286 | 5/1978 | Noll et al. ..................... 524/591 |
| 4,666,984 | 5/1987 | Carlick et al. ................. 525/131 |
| 4,734,462 | 3/1988 | Liedloff et al. ................ 525/424 |
| 4,957,979 | 9/1990 | Albini et al. ................. 525/420.5 |
| 5,039,732 | 8/1991 | Arora ........................... 524/591 |

*Primary Examiner*—Ana Woodward
*Attorney, Agent, or Firm*—Anne Gerry Sabourin

[57] ABSTRACT

The present invention relates to ionic and nonionic polyamide modified polyurethane polymers for use in coating compositions, a method for forming the polymer and coating compositions containing these polymers. The polyamide modified polyurethane polymers of the present invention include polyamide formed from aromatic, aliphatic, or cycloaliphatic anhydrides or diacid halides and an amine containing compound such as amino alcohol, amino thiol, diamine or mixtures thereof, wherein the reactive terminii of the polyamide ere substituted by hydroxyl or thiol functional groups, together with a chain extending alcohol and diisocyanate functional monomer.

6 Claims, No Drawings

WATER DISPERSIBLE IONIC AND NONIONIC POLYAMIDE MODIFIED POLYURETHANE RESINS FOR USE IN COATING COMPOSITION

CROSS REFERENCE TO RELATED APPLICATION

This application is a continuation of application Ser. No. 08/328,623, filed Oct. 25, 1994, now abandoned, which is a Continuation-in-Part of Ser. No. 07/969,662, filed Oct. 30, 1992, now abandoned which are hereby incorporated by reference.

FIELD OF THE INVENTION

The present invention pertains to the field of polyurethane resins, and more specifically to ionic and nonionic polyamide modified polyurethane resins for use in coating compositions and coating compositions containing the same.

BACKGROUND OF THE INVENTION

The use of polyurethane resins in coating compositions is well known. These resins are generally synthesized by treatment of diisocyanates with diols. Such resins are disclosed in U.S. Pat. No. 4,794,147. Polyurethane resins are widely used for both basecoat and clearcoat coating compositions. There is however, ongoing research to develop resins and coatings with improved performance characteristics. One area of performance concerns the resistance of a cured coating to stone chipping and impact resistance.

The damage caused by chipping and impact is particularly problematic in the area of vehicle coatings. The availability of a resin and coating that provides improved chip and impact resistance provides an important advance in the art. Costly repairs to coatings damaged from stone chipping and other impacts could be greatly reduced, and the life of a coated article prolonged.

It has unexpectedly been found that polyamide modified polyurethane resins are useful in a coating composition, because the polyamides themselves are highly viscous and have low solubility. It is also surprising, because of the low solubility of the polyamides, that the polyamide modified polyurethane resin has excellent water dispersibility properties. The coating containing the polyamide modified resin exhibits a high degree of transparency and provides a high quality clearcoat. Additionally, the coatings demonstrate good resistance to high humidity conditions.

This invention, therefore, relates to the field of polyurethane coatings for use in automobile basecoat/clearcoat systems. In particular, this invention relates to the discovery that polyamide modified polyurethane resins and coating compositions prepared therefrom demonstrate a high degree of resistance to stone chipping and damage caused by both direct and reverse impact. These coating compositions exhibit coating characteristics superior to those taught by the art and are especially useful as clearcoats and basecoats for automobiles.

SUMMARY OF THE INVENTION

The ionic and nonionic polyamide modified polyurethane resins of the present invention include a polyamide compound substituted at both terminii with hydroxyl or thiol groups, prepared from i) aromatic, aliphatic, or cycloaliphatic anhydrides or diacid halides and ii) an amine containing compound selected from the group consisting of amino alcohols, amino thiols diamines and mixtures thereof. Where the amine used as compound ii) is diamine, the polyamide is subsequently reacted with excess amino alcohol to provide a hydroxy terminal polyamide. The polyamide compound is chain extended by the addition of polyol, and then reacted with one or more diisocyanate functional monomers to form the polyurethane. The polyurethane may be further reacted with compounds containing hydrophilic functional groups to improve dispersibility in aqueous solutions.

The coating compositions of the present invention include the polyamide modified polyurethane resins as described above in combination with a crosslinking agent. The crosslinking agent may be a melamine or isocyanate crosslinker.

The amide modified polyurethanes of the present invention, method for preparing the polyurethane and coating compositions for water based coatings, containing these polyurethane polymers are more fully described herein below.

DETAILED DESCRIPTION OF THE INVENTION

The polyamide modified polyurethane resin and coating composition of the present invention are formulated to provide improved resistance to stone chipping and improved resistance to both direct and reverse impact.

The water dispersible polyamide modified polyurethane resin of the present invention comprises (a) a polyamide compound, substituted at its reactive terminii with hydroxyl or sulfoxyl groups, obtained by reacting i) an organic compound selected from the group consisting of aromatic, aliphatic, and cycloaliphatic anhydrides and diacid halides with ii) an amine containing compound including amino alcohols, amino thiols, diamines and mixtures thereof, b) a chain extending alcohol selected from the group consisting of aromatic and aliphatic diols, polyols and mixtures thereof, and c) a diisocyanate functional monomer.

The compound (i), used to form the polyamide is preferably a cycloaliphatic anhydride or a diacid halide. Examples of these include, but are not limited to 1,2-cyclohexane dicarboxylic anhydride, phthalic anhydride or succinic anhydride, or a diacid halide such as terephthaloyl chloride, succinyl chloride or adipoyl chloride. The amine containing compound (ii), used to form the polyamide includes primary and secondary amino alcohols, amino thiols or diamines. Examples of suitable amino alcohols include, but are not limited to ethanolamine, propanol amine, 2-amino-2-methyl-1-propanol and diethanol amine. An example of a suitable amino thiol is 2-amino ethanethiol. Suitable diamines include diaminocyclohexane and ethylene diamine.

The polyamide formed by the reaction of compounds (i) and (ii) is formulated to provide a polyamide having hydroxyl or thiol substituted reactive terminii. If diamine is used as the amine containing compound, the product is subsequently reacted with excess amino alcohol to provide a polyamide substituted at its reactive terminii with hydroxyl groups. The thiol or hydroxyl reactive functionalities allow the polyamide to be readily polymerized into the polyurethane polymer without the formation of urea linkages during polymerization.

The polyurethane polymer is formed by the reaction of diol or polyol, with isocyanate, and polyamide. The isocyanate functionality on the polyurethane reacts with the thiol or hydroxyl reactive terminii on the polyamide to form a polyamide functional polyurethane. Polyamides of the present invention have a weight average molecular weight of between 200 and 2000. It is important that polyamides have a high enough molecular weight to provide adequate polyamide character in the polyurethane.

The polyamides, having a molecular weight of between 200 and 2000 are synthesized from anhydrides by either of two methods. The first method results in polyamides with a molecular weight of between about 200 and about 300, and is as follows. One mole of cyclic anhydride as described above, is dissolved in a suitable, low boiling point aromatic solvent such as toluene, xylene or benzene. The anhydride is then reacted with two molar equivalents of an amino alcohol as described above. The reaction exotherms from room temperature to 80+° C. The mixture is then heated to between about 100° C. and about 140° C., liberating water, which is collected and weighed. When the calculated amount of water is collected and removed, the reaction mixture is cooled and the diol terminated polyamide product is collected. The resulting polyamide typically has a molecular weight of between about 200 and about 300.

Di-thiol terminated polyamides are prepared by the same process by substituting amino thiols for the amino alcohol.

The second method for preparing polyamides from anhydrides results in polyamides with molecular weights between 300 and 2,000. In this method, a diamine is treated with two molar equivalents of a cyclic anhydride instead of one, in a suitable solvent and heated, if necessary, to between 100° C. and 130° C. until an acid number is obtained which is consistent with a dicarboxylic acid terminated amide. This intermediate is then treated with two molar equivalents of an amino alcohol and heated to between 120° C. and 140° C. When a calculated amount of water is collected and discarded, the reaction mixture is cooled to room temperature to afford the diol terminated polyamide.

Two methods for obtaining the diol terminated polyamide from diacid chloride and amino alcohol are described as follows. In the first method, the diacid chloride is dissolved in a suitable solvent such as methylene chloride, chloroform or 1,2-dichloroethane, and is then treated with two molar equivalents of an amino alcohol and two molar equivalents of a tertiary amine base which neutralizes the hydrochloric acid produced during the course of the reaction. The resultant mixture is allowed to react to afford the diol terminated polyamide. The crude reaction mixture is then titrated with a stoichiometric amount of sodium bicarbonate. The resulting diol terminated polyamide has a molecular weight of between 200 and 400.

In the second method, diol terminated polyamides having a molecular weight in the range of 400 to 2000, are obtained by first treating a diamine with two molar equivalents of a diacid chloride in the presence of two molar equivalents of a tertiary amine base. A diacid chloride terminated polyamide intermediate is formed. This intermediate is then treated with two molar equivalents of an amino alcohol in the presence of two molar equivalents of a tertiary amine base. The reaction mixture is treated with sodium bicarbonate and filtered as described above.

The polyester polyols usable as compound (b) are formed by reacting a compound having at least two carboxylic acid functionalities with at least two alcohol functionalities. The carboxylic acid component of the polyester may be comprised of long chain dicarboxylic acids, short chain dicarboxylic acids, mixtures thereof or carboxylic acid equivalents such as anhydrides, lactones, and polycarbonates, among others. Long chain monocarboxylic acids may also be used, but these are generally employed to chain terminate the polyester resin.

The shorter chain carboxylic acid component, if used, may be comprised of mono-, di-, or higher functionality carboxylic acids, or a mixture of these carboxylic acids having carbon chains of 18 or fewer carbon atoms. Monocarboxylic acids function to terminate a polyester chain and are chosen for that purpose. It is preferable that the short chain carboxylic acid component be a dicarboxylic acid. Such preferred dicarboxylic acid compounds include, for example adipic, azeleic, and other aliphatic dicarboxylic acids. Also suitable are aromatic dicarboxylic acids. Especially preferred is isophthalic acid. Alkylene and aralkylene carboxylic acids may also be employed.

The polyester polyols are synthesized from one or more of the above-described carboxylic acid components and an excess of a polyol component. An excess of polyol is used so that the polyester resin preferably contains terminal hydroxyl groups. The polyol compounds preferably have an average hydroxy functionality of at least 2. The polyester polyol is comprised of one or more polyols, preferably a diol. Up to about 25 percent by weight of the polyol component may be a polyol having three or more hydroxy groups per molecule. Where polyols having three or more hydroxy groups are chosen, the result is a branched polyester.

While it is not always desirable to have a triol or higher multi-functional alcohol present because of the tendency to form a branched chain polyester, some branching may be desirable, especially in the case where the polyester is to be incorporated into a branched polyurethane. There may also be a small amount of monoalcohol in the polyol component, particularly if larger proportions of higher functional alcohols are used. These alcohols serve as chain terminators.

The diols usually employed in making the polyester polyols include alkylene glycols, such as ethylene glycol, propylene glycol, butylene glycol, neopentyl glycol, and 1,6-hexanediol and other glycols such as hydrogenated bisphenol A, cyclohexane dimethanol, caprolactone diol (i.e. the reaction product of caprolactone and ethylene glycol), hydroxylated bisphenols, and the like. However, other diols of various types and, as indicated polyols of higher functionality may also be utilized. Such higher functional alcohols can include for example, trimethylolpropane, trimethylolethane, pentaerythritol, and the like, as well as higher molecular weight polyols.

The low molecular weight diols which are preferred in the invention have hydroxy values of 200 or above, usually within the range of about 1500 to 2000. Such materials include aliphatic diols, particularly alkylene polyols containing from 2 to 18 carbon atoms. Examples include ethylene glycol, 1,4-butanediol, cycloaliphatic diols such as 1,2-cyclohexanediol and cyclohexane dimethanol. An especially preferred diol is 1,6-hexanediol.

Suitable polyester polyols are prepared as set forth in Examples 1–3. However, any suitable method of preparation may be employed. Generally, the reaction is conducted at a temperature of between about 200° and 230° C., and preferably between 210° C. and 220° C. The reaction time ranges from about 15 hours to about 30 hours. Preferably reaction time is between 18 hours and 25 hours. The polyester polyols have a solids content ranging from 70 to 90 percent, and preferably between 75 and 85 percent.

Suitable polycarbonate polyols are prepared from diethyl carbonate and an excess of a polyol component. An excess of polyol is used so that the polycarbonate is hydroxy terminated. The diethyl carbonate is present in an amount of between 20 and 40 percent by weight. The polyol component is as described above for the polyester polyol. The polyol or mixture thereof is present in an amount between about 50 and 80 percent by weight. A catalyst such as an organic titanate is also utilized. A preferred catalyst is tetraisopropyl titanate, sold under the trademark TYZOR®, and available from DuPont.

The polycarbonate polyols are prepared as set forth in Examples 4 and 5. However, any suitable method of preparation may be employed. Generally, the reaction is conducted at a temperature of between about 120° and 140° C., and preferably between 120° C. and 130° C. The reaction time ranges between about 1 hour and about 2 hours. Preferably reaction time is between 1 hours and 1.5 hours. The resulting polycarbonate has a molecular weight range of 1100 to 1900 with a melting point range of 35° to 70° C.

Formulations for specific polyols are set forth in the Examples following the detailed description.

An excess of isocyanate monomer, preferably diisocyanate functional monomer, is included to produce an intermediate polyurethane resin having free isocyanate groups at the ends. The diisocyanate functional monomer is preferably an aliphatic diisocyanate compound such as isophorone diisocyanate, 1,6-hexamethylene diisocyanate, 1,4-butylene diisocyanate, methylene bis 4-cyclohexyl isocyanate, 2,4 toluene diisocyanate, dicyclohexylmethane diisocyanate, diphenyl methane-4:4'diisocyanate, toluene diisocyanate, methylcyclohexylene diisocyanate, and cyclohexylmethane diisocyanate, biurets of any of the aforementioned diisocyanates, and mixtures thereof.

The polyamide compound (a) is utilized in an amount between 1.0 to 25 percent by weight, and preferably between 5 and 10 percent by weight based on total polyurethane resin weight. The alcohol (b) is present in an amount between 30 to 70 percent by weight, and preferably between 45 and 60 percent by weight based on total polyurethane resin weight. The diisocyanate functional monomer (c) is utilized in an amount between 15 and 30 percent by weight, and preferably between 18 and 23 percent by weight, based on total polyurethane resin weight.

The polyamide modified polyurethane polymer is prepared by the following reaction. The polyamide compound is mixed with the chain extending alcohol, diisocyanate and low molecular weight ketone solvent such as methyl ethyl ketone, methyl isobutyl ketone, methyl amyl ketone and methyl propyl ketone. The resin has a non volatile content ranging from about 65 percent to about 95 percent, and preferably from 75 percent to 90 percent. The reaction is conducted at a temperature of between about 90° and 160° C., and preferably between 105° C. and 120° C. The reaction time ranges from about 2 hours to about 6 hours. Preferably reaction time is between 1.5 hours and 4 hours.

The amide modified polyurethane resins obtained by the reaction described above are stabilized to improve the water miscibility of the resin, by reacting the resin with compounds having a hydrophilic functional group. The hydrophilic group reacts with the isocyanate functionality to form a side chain, which imparts water soluble character to the polymer.

The anionic resins are stabilized by reaction with compounds having ionizable functional groups such as carboxyl groups. The compound is present in an amount between about 5 and about 25 percent by weight and preferably in an amount between about 8 and about 20 percent by weight based on total resin weight. The desired degree of water miscibility is achieved with a polymeric resin having an acid number from about 15 to about 55 and preferably from about 18 to 30. The preferred compound is dimethyl propionic acid.

The anionic polyurethane resins are made water dispersible by the addition of an amine selected from the group consisting of primary, secondary and tertiary alkylamines, to promote water dispersibility.

The nonionic resins are stabilized by reaction with compounds having hydrophilic groups that are non-ionizable. These compounds include monofunctional and difunctional polyethers and polyalkylene oxides. The monofunctional polyethers are preferably formed from monoalcohol initiated polymerization of ethylene oxide, propylene oxide, and mixtures thereof. Examples of suitable compounds having nonionizable functional groups include polyvinylmethyl ether, polyethylene oxide, polypropylene oxide, polyoxymethylene, polyaziridine and polyethylene imine. These compounds have a molecular weight of between 1200 and 3000 and are present in an amount between about 5 percent to about 30 percent by weight, preferably from about 8 to about 20 percent by weight based on total weight of the final polyurethane resin.

The NCO content of the resultant polyurethane polymer is from about 0.18 to about 0.30 meq, preferably 0.22 to 0.28 meq of isocyanate per gram of polymer. Any unreacted isocyanate remaining in the polyamide modified polyurethane resin composition can be capped with a trifunctional monomer to increase the molecular weight and the hydroxyl density of the resin. Suitable monomers for this purpose include amino alcohols such as ethanolamine and diethanolamine since the amino groups preferentially react with the isocyanate groups present. Multi-functional alcohols such as trimethylolpropane and ethylene glycol can also be used for this purpose. The increase in hydroxyl density is used for crosslinking with a melamine or an isocyanate crosslinker during the film forming process. The capping ratio of OH/NCO is typically 3:1, so that limited branching occurs and the optimal amount of hydroxyl density is present for crosslinking, however, ratios of OH/NCO may be as low as 2:1.

Nonionic resins utilize coupling solvents as dispersion aids, to promote water dispersibility. Such solvents include n-butanol, butylcellosolve, carbitol, butyl carbitol and cellosolve acetate Following this step the resin is then dispersed in deionized water.

The polyamide modified polyurethane resin is formulated into a basecoat or clearcoat composition by mixing the polyamide modified polyurethane resin with a suitable crosslinking agent. The crosslinking agents may include monomeric or polymeric aminoplasts or polyisocyanates.

Aminoplast resins are aldehyde condensation products of melamine, urea and similar compounds. Products obtained from the reaction of formaldehyde with melamine, urea, or benzoguanamine are most common and are preferred herein. However, condensation products of other amines and amides can also be employed, for example, aldehyde condensates of triazines, diazines, triazoles, guanidines, guanamines, and alkyl and aryl substituted derivatives of such compounds, including alkyl and aryl substituted ureas and alkyl and aryl substituted melamines. Some examples of such compounds are N,N'-dimethylurea, benzourea, dicyandiamide, formoguanamine, acetoguanamine, ammeline, 2-chloro-4,6-diamino-1,3,5-triazine, 6-methyl-2,4-diamino,1,3,5-triazine, 3-5-diamino-triazole, triaminopyrimidine, 2-mercapto-4,6-diaminopyrmidine and 2,4,6-triethyl triamino-1,3,5 triazine.

Alternatively, a polyisocyanate crosslinker may be used. Examples of suitable isocyanate crosslinkers include aliphatic diisocyanate compound such as isophorone diisocyanate, 1,6-hexamethylene diisocyanate, 1,4-butylene diisocyanate, methylene bis 4-cyclohexyl isocyanate, 2,4 toluene diisocyanate, dicyclohexylmethane diisocyanate, diphenyl methane-4:4'diisocyanate, toluene diisocyanate, methylcyclohexylene diisocyanate, and cyclohexylmethane diisocyanate, biurets of any of the preceding diisocyanates, and mixtures thereof.

Other components of the coating composition include pigments, one or more rheology control agents, water and a small amount of organic solvent if needed. Other agents may be included such as various fillers, surfactants, plasticizers, wetting agents, defoamers, adhesion promoters, catalysts, conditioning agents, thickeners, antioxidants, leveling agents and mixtures thereof.

When the polyamide modified polyurethane resin of the present invention is utilized in a basecoat formulation, a grind resin may also be included in the basecoat. The grind resin may be comprised of a number of polyurethane resins, which may be the same as or different from the principal or major vehicle resin in chemical character. The grind resin may range between about 2 and about 25% by weight of the total solids in the coating composition and preferably comprises about 5–40% by weight of the basecoat composition.

Pigments may be incorporated into the basecoat composition to provide the desired cosmetic characteristics. This is done by mixing pigments with the above-described grind resin, and in addition, optionally, aminoplast resin to form a pigment paste.

The final pigment paste comprises about 3% to about 65% by weight of a pigment and about 5% to about 65% by weight of a grind resin, and optionally, up to 50% by weight of a cross-linking agent.

Any standard pigment known in the art may be used with resins of the present invention so long as these pigments can be formulated without affecting the desired characteristics of the resins. Specific examples of dye stuffs or pigments may be inorganic or organic, for example graphite, carbon black, zinc chromate, strontium chromate, barium chromate, lead chromate, lead cyanide, titanium dioxide, zinc oxide, cadmium sulfide, iron oxide, aluminum flakes, zinc sulfide, phthalo cyanine complexes, naphthol red, quinacridones and halogenated thioindigo pigments, among others.

Metallic flake pigments such as aluminum flake and silver may be used alone or in mixture with non-metallic pigments.

The resinous dispersions of basecoat or clearcoat are dispersed in organic solvents such as butyl cellosolve, xylene, N-butyl acetate, butyl alcohol, carbitol, and N-propyl acetate.

The basecoat compositions of the present invention are applied in one or more coats to a substrate which can be metallic, plastic, ceramic, wood, paper, etc. The coating may be sprayed or electrostatically deposited onto the substrate.

After being deposited, the substrate may be flash dried at a temperature sufficient to remove a portion of the solvent, but below that sufficient to cure the applied coating, typically temperatures within the range of from room temperature to about 145° F. (63° C.). After the first basecoat is deposited, one or more additional layers of basecoat can be deposited over the first, either with or without flash drying. One or more clear, transparent top coat layers are then subsequently applied over the last base coat layer.

After the clear coat is applied over the base coat layer(s), the multi-layer coating is then baked to crosslink and cure the polymeric materials and to drive the small amount of residual water and/or solvent from the coating layer(s). This baking step generally involves the heating of the coated substrate for periods of from about 10 to about 60 minutes and temperatures ranging between about 150° F. (66° C.) and 300° F. (149° C.). The baking step cures the multi-layer coating to a hard, durable film.

The invention will be further described in connection with several examples that follow. These examples are shown by way of illustration of the invention and are not meant to limit the scope of the invention. All parts and percentages in the examples are by weight unless otherwise indicated.

EXAMPLES

Example 1

Linear Polyester Diol Intermediate

The following reactants were weighed and charged to a three neck round bottom flask. The reactor was set up to go through a packed column equipped with a moisture trap. The trap was initially filled with xylene.

| RAW MATERIAL | WT % |
| --- | --- |
| Dimer fatty acid | 53.73 |
| Isophthalic acid | 15.45 |
| 1,6 Hexane diol | 28.64 |
| Xylene | 2.18 |
| TOTAL | 100.00 |

The mixture was blanketed with nitrogen and the reaction temperature increased slowly until a temperature of 215° C. was reached. The reaction was held at this temperature until an acid number of 4.00–3.5 was reached about 18–25 hours). Once the temperature of 215° C. was reached xylene was stopped from returning to the reactor. When the reaction reached an acid number of 4.00–3.50, the reaction was cooled to 150° C. When the temperature of 150° C. was reached, vacuum was slowly applied to strip the remaining xylene. Vacuum was increased until 26–28 inches of vacuum was achieved. This vacuum was held until all of the solvent was removed. Then, vacuum was broken and the reaction cooled to 120° C. When the temperature reached 120° C., solids were adjusted with 82% methylpropylketone.

Example 2

Polyester Intermediate with Dimer Fatty Acid

The following reactants were weighed and charged to a three neck round bottom flask. The reactor was set up to go through a packed column equipped with a moisture trap. The trap was initially filled with toluene.

| RAW MATERIAL | WT % |
| --- | --- |
| Dimer fatty acid | 30.294 |
| Adipic acid | 30.294 |
| 1,6 Hexane diol | 37.203 |
| Toluene | 2.208 |
| TOTAL | 100.00 |

The mixture was blanketed with nitrogen and the reaction temperature increased slowly until a temperature of 215° C. was reached. The reaction was held at this temperature until an acid number of 4.00–3.5 was reached. This reaction time ranged from 18 to 25 hours. Once the temperature of 215° C. was reached toluene was stopped from returning to the reactor. When the reaction reached an acid number of 4.00–3.50, the reaction was cooled to 150° C. When the temperature of 150° C. was reached, vacuum was slowly applied to strip the remaining toluene. Vacuum was increased until 26–28 inches of vacuum was achieved. This vacuum was held until all of the solvent was removed. Then, vacuum was broken and the reaction cooled to 120° C. When the temperature reached 120° C., solids were adjusted with 82% methylpropylketone.

Example 3

Non Dimer Fatty Acid Polyester

The following reactants were weighed and charged to a three neck round bottom flask. The reactor was set up to go through a packed column equipped with a moisture trap. The trap was initially filled with xylene.

| RAW MATERIAL | WT % |
| --- | --- |
| Heptanedioic acid | 27.426 |
| Adipic acid | 25.365 |
| 1,6 Hexane diol | 45.033 |
| Toluene | 2.160 |
| TOTAL | 100.00 |

The mixture was blanketed with nitrogen and the reaction temperature increased slowly until a temperature of 215° C. was reached. The reaction was held at this temperature until an acid number of 4.00–3.5 was reached, about 18–25 hours. Once the temperature of 215° C. was reached toluene was stopped from returning to the reactor. When the reaction reached an acid number of 4.00–3.50, the reaction was cooled to 150° C. When the temperature of 150° C. was reached, vacuum was slowly applied to strip the remaining toluene. Vacuum was increased until 26–28 inches of vacuum was achieved. This vacuum was held until all of the solvent was removed. Then, vacuum was broken and the reaction cooled to 120° C. When the temperature reached 120° C., solids were adjusted with 82% methylpropylketone.

Example 4

Polycarbonate Diol of 1,6 Hexane Diol and Neopentyl Glycol

The following reactants were weighed and charged to a three neck round bottom flask.

| 1,6-hexane diol | 2.57 moles |
| --- | --- |
| neopentyl glycol | 2.25 moles |
| diethyl carbonate | 4.72 moles |

The above ingredients were combined, by first forming a mixture of the diol and glycol and then adding the diethyl carbonate. To this mixture a catalyst (i.e. Lewis acid) was added to assist the reaction. The Lewis acid chosen was an organic titanate such as tetraisopropyl titanate (TYZOR From DuPont). The amount of catalysts were used based on the total weight of diol and carbonate used amounting to approximately 600 parts per million by weight. A small amount of xylene was used to dissolve the two diols so that the reaction would be a homogenous reaction instead of a two phase system.

The reaction mixture was heated slowly under nitrogen atmosphere until the temperature of 130° C. was reached. At this point ethyl alcohol and xylene were distilled from the reaction. After the reaction was complete, (shown by no ethyl alcohol being distilled over), the reaction mixture was subjected to a vacuum strip to remove the last traces of ethyl alcohol.

The resulting polycarbonate diol was a waxy solid which ranged in molecular Weight from 1100 to 1900 with a melting point ranging from 36° to 48° C.

Example 5

Polycarbonate Diol of Hydrogenated Bisphenol A and 1,6-hexane diol

The following ingredients were weighed and charged to a three neck round bottom flask.

| hydrogenated bisphenol A | 2.083 moles |
| --- | --- |
| 1,6-hexanediol | 2.083 moles |
| diethyl carbonate | 3.90 moles |

First a mixture of diols was formed and this mixture was then combined with the diethyl carbonate. An organic titanate catalyst, tetraisopropyl titanate from DuPont, was used to assist the reaction. The amount of catalyst used was based on the total weight of the diol and carbonate used in the reaction. This amounted to approximately 600 parts per million by weight. A small amount of xylene was used to dissolve the two diols so that the reaction would be homogenous instead of a two phase system.

The reaction mixture was heated slowly under a nitrogen atmosphere until the temperature of 130° C. was reached. At this point ethyl alcohol and xylene were distilled from the reaction. After the reaction reaches 130° C. the total time to completion is between 60 and 90 minutes. After the reaction was complete, (i.e. no signs of ethyl alcohol being distilled over), the last traces of ethyl alcohol were removed by vacuum strip distillation.

The resulting polycarbonate diol was a waxy solid which ranged in molecular weight from 1200 to 1800 with a melting point ranging from 48° to 67° C.

Example 6

Nonionic Amide Modified Polycarbonate Polyester Polyurethane

The following ingredients were reacted as explained below to form a nonionic amide modified polycarbonate polyester polyurethane resin.

| Ingredient | Weight % |
| --- | --- |
| 1. Polyester diol | 22.35 |
| 2. Amide diol | 1.33 |
| 3. Polycarbonate diol | 3.52 |
| 4. Polyethylene oxide[a] | 5.86 |
| 5. Trimethylol propane | 0.53 |
| 6. Isophorone Diisocyanate | 7.32 |
| 7. Methyl propyl ketone | 1.01 |
| 8. Neopentyl glycol | 0.46 |
| 9. Trimethylol propane | 0.35 |
| 10. Butyl cellosolve | 10.63 |
| 11. Deionized water | 41.64 |
| TOTAL | 100.00 |

[a]Carbowax ®, a polyethylene oxide having a molecular weight of 2000, available from Union Carbide.

The first seven ingredients, in the amounts specified, were charged to a 3 neck flask, placed under a nitrogen blanket and heated to 109° C. The reaction mixture was held at this temperature for three hours. After three hours the first titration was made.

When it was determined by titration that there was 0.24 meq isocyanate per gram of resin remaining, the remaining isocyanate was capped. For capping the neopentyl glycol and trimethylolpropane, in the amounts specified were added to the reaction mixture and heated to 109° C. for two hours. After titration showed that there was no remaining isocyanate, the reaction was cooled to 92° C. and charged with the butyl cellosolve. The reaction cooling was continued until a temperature of 56° C. was reached. The resulting polyurethane resin was then charged with deionized water.

<sup>a</sup>Carbowax®, a polyethylene oxide having a molecular weight of 2000, available from Union Carbide.

Example 7

Nonionic Amide Modified Polyurethane

The following ingredients were reacted as described herein below to provide a nonionic amide modified polyurethane polymer.

| Ingredient | Weight % |
| --- | --- |
| 1. Polyester Diol | 30.87 |
| 2. Polyethylene Oxide<sup>a</sup> | 5.86 |
| 3. Amide diol | 1.33 |
| 4. Trimethylolpropane | 0.53 |
| 5. Isophorone Diisocyanate | 6.88 |
| 6. methyl propyl ketone | 1.01 |
| 7. neopentyl glycol | 0.46 |
| 8. trimethylolpropane | 0.35 |
| 9. butyl cellosolve | 10.63 |
| 10. deionized water | 42.08 |
| TOTAL | 100.00 |

<sup>a</sup>Carbowax ® a polyethylene oxide having a molecular weight of 2000 available from Union Carbide.

The first six ingredients, in the amounts specified, were charged to a 3 neck flask, placed under a nitrogen blanket and heated to 109° C. The reaction mixture was held at this temperature for three hours. After three hours the first titration was made.

When it was determined by titration that there was 0.24 meq isocyanate per gram of resin remaining, the remaining isocyanate was capped. For capping the neopentyl glycol and trimethylolpropane, in the amounts specified were added to the reaction mixture and heated to 109° C. for two hours.

After titration showed that there was no remaining isocyanate, the reaction was cooled to 92° C. and charged with the butyl cellosolve. The reaction cooling was continued until a temperature of 56° C. was reached. The resulting polyurethane resin was then charged with deionized water.

<sup>a</sup>Carbowax® a polyethylene oxide having a molecular weight of 2000 available from Union Carbide.

Example 8

Anionic Amide Modified Polyurethane Resin

| Ingredient | Weight % |
| --- | --- |
| 1. Polyester Diol | 15.75 |
| 2. Amide Diol | 4.60 |
| 3. Dimethylolpropionic acid | 1.09 |
| 4. neopentyl glycol | 0.36 |
| 5. isophorone diisocyanate | 6.95 |
| 6. methyl ethyl ketone | 2.45 |
| 7. trimethylolpropane | 1.10 |
| 8. n-butanol | 1.92 |
| 9. dimethyl ethanolamine | 0.72 |
| 10. n-butanol | 0.30 |
| 11. deionized water | 64.80 |
| TOTAL | 100.00 |

The first six ingredients, in the amounts specified, were charged to a 3 neck flask, placed under a nitrogen blanket and heated to 109° C. The reaction mixture was held at this temperature for three hours. After three hours the first titration was made.

When it was determined by titration that there was 0.24 meq isocyanate per gram of resin remaining, the remaining isocyanate was capped. For capping, the trimethylolpropane, in the amounts specified was added to the reaction mixture and heated to 109° C. for two hours. After titration showed that there was no remaining isocyanate, the reaction was cooled to 92° C. and charged with n-butanol and dimethylethanolamime. The reaction cooling was continued until a temperature of 56° C. was reached. The resulting polyurethane resin was then charged with deionized water.

Example 9

Anionic Amide Modified Polyester Polycarbonate Polyurethane Resin

| Ingredient | Weight % |
| --- | --- |
| 1. Polyester Diol | 14.28 |
| 2. Amide Diol | 2.60 |
| 3. Polycarbonate Diol | 2.60 |
| 4. Dimethylolpropionic acid | 1.09 |
| 5. neopentyl glycol | 0.36 |
| 6. isophorone diisocyanate | 6.95 |
| 7. methyl ethyl ketone | 2.45 |
| 8. n-butanol | 1.19 |
| 9. dimethyl ethanolamine | 0.72 |
| 10. n-butanol | 1.76 |
| 11. deionized water | 64.79 |
| TOTAL | 100.00 |

The first seven ingredients, in the amounts specified, were charged to a 3 neck flask, placed under a nitrogen blanket and heated to 109° C. The reaction mixture was held at this temperature for three hours. After three hours the first titration was made.

When it was determined by titration that there was 0.24 meq isocyanate per gram of resin remaining, the remaining isocyanate was capped. For capping, the trimethylolpropane, in the amounts specified was added to the reaction mixture and heated to 109° C. for two hours. After titration showed that there was no remaining isocyanate, the reaction was cooled to 92° C. and charged with n-butanol and dimethylethanolamime. The reaction cooling was continued until a temperature of 56° C. was reached. The resulting polyurethane resin was then charged with deionized water.

We claim:

1. An aqueous coating composition comprising
   A. a water dispersible polyamide modified polyurethane resin which is the reaction product of
      a) 1 to 25% by weight of a polyamide compound having both reactive termini substituted with hydroxyl groups which is the reaction product of i) a compound selected from the group consisting of aromatic, aliphatic, and cycloaliphatic anhydrides, and diacid halides and ii) 30 to 70% of amine containing monomers selected from the group consisting of amino monools, and mixtures thereof, b) 30 to 70% by weight of a chain extending polymeric alcohol selected from the group consisting of polyester polyols, polyether polyols, polycarbonate polyols, and mixtures thereof, c) 15 to 30% by weight of a diisocyanate monomer, and d) a hydrophilic compound, to provide water miscibility, selected from the group consisting of nonionic compounds selected from the group consisting of polyethylene imine, polyaziridine, polyvinyl methyl ether, and mixtures thereof, and anionic compounds selected from the group consisting of primary alkylamines, secondary alkylamines, tertiary alkylamines, carboxyl containing compounds, and mixtures thereof, wherein the compounds (d) having non-ionizable functional groups are present in an amount between 5 and 30% by weight, when used, and the alkylamines when used as compound (d) are present in an amount between 5 and 30% by weight, and B. a crosslinking agent.

2. The coating composition of claim 1, wherein the polyamide compound (a) has a molecular weight of between about 200 and about 2000.

3. The coating composition of claim 1, wherein the diisocyanate functional monomer (c) is an aliphatic or cycloaliphatic diisocyanate compound.

4. The coating composition of claim 1, wherein the crosslinking agent is selected from the group consisting of aminoplast and polyisocyanate crosslinking agents.

5. The coating composition of claim 1, wherein the coating is a basecoat composition.

6. The coating composition of claim 1, wherein the coating is a clearcoat composition.

* * * * *